United States Patent
Sugahara

(10) Patent No.: US 11,375,081 B2
(45) Date of Patent: Jun. 28, 2022

(54) APPARATUS, METHOD, AND STORAGE MEDIUM FOR CONVERTING A COLOR IMAGE TO A MONOCHROME IMAGE

(71) Applicant: CANON KABUSHIKI KAISHA, Tokyo (JP)

(72) Inventor: Asako Sugahara, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/689,857

(22) Filed: Nov. 20, 2019

(65) Prior Publication Data
US 2020/0177764 A1 Jun. 4, 2020

(30) Foreign Application Priority Data
Nov. 30, 2018 (JP) .............................. JP2018-225489

(51) Int. Cl.
*H04N 1/40* (2006.01)
*H04N 1/60* (2006.01)

(52) U.S. Cl.
CPC ....... *H04N 1/40012* (2013.01); *H04N 1/6063* (2013.01); *H04N 1/6022* (2013.01)

(58) Field of Classification Search
CPC combination set(s) only.
See application file for complete search history.

(56) References Cited

U.S. PATENT DOCUMENTS

| 11,095,794 | B2 * | 8/2021 | Nagasaka | .......... | H04N 1/40012 |
| 2004/0257378 | A1 * | 12/2004 | Braun | .............. | H04N 1/40012 |
| | | | | | 345/591 |
| 2007/0058188 | A1 * | 3/2007 | Nakahara | ............. | H04N 1/6072 |
| | | | | | 358/1.13 |
| 2008/0137148 | A1 * | 6/2008 | Oh | ..................... | H04N 1/40012 |
| | | | | | 358/3.23 |
| 2019/0035065 | A1 * | 1/2019 | Yazawa | .............. | H04N 1/40012 |

FOREIGN PATENT DOCUMENTS

JP H10-108010 * 4/1998
JP 2017-38242 A 2/2017

* cited by examiner

*Primary Examiner* — Barbara D Reinier
(74) *Attorney, Agent, or Firm* — Canon U.S.A., Inc. IP Division

(57) ABSTRACT

An image processing is configured to convert a color of a first object into gray having first brightness and a color of a second object into gray having second brightness lower than the first brightness by a fixed value in response to receiving color data including the first object and the second object, and output gray data based on the first brightness of gray into which the color of the first object is converted and the second brightness of gray into which the color of the second object is converted.

18 Claims, 9 Drawing Sheets

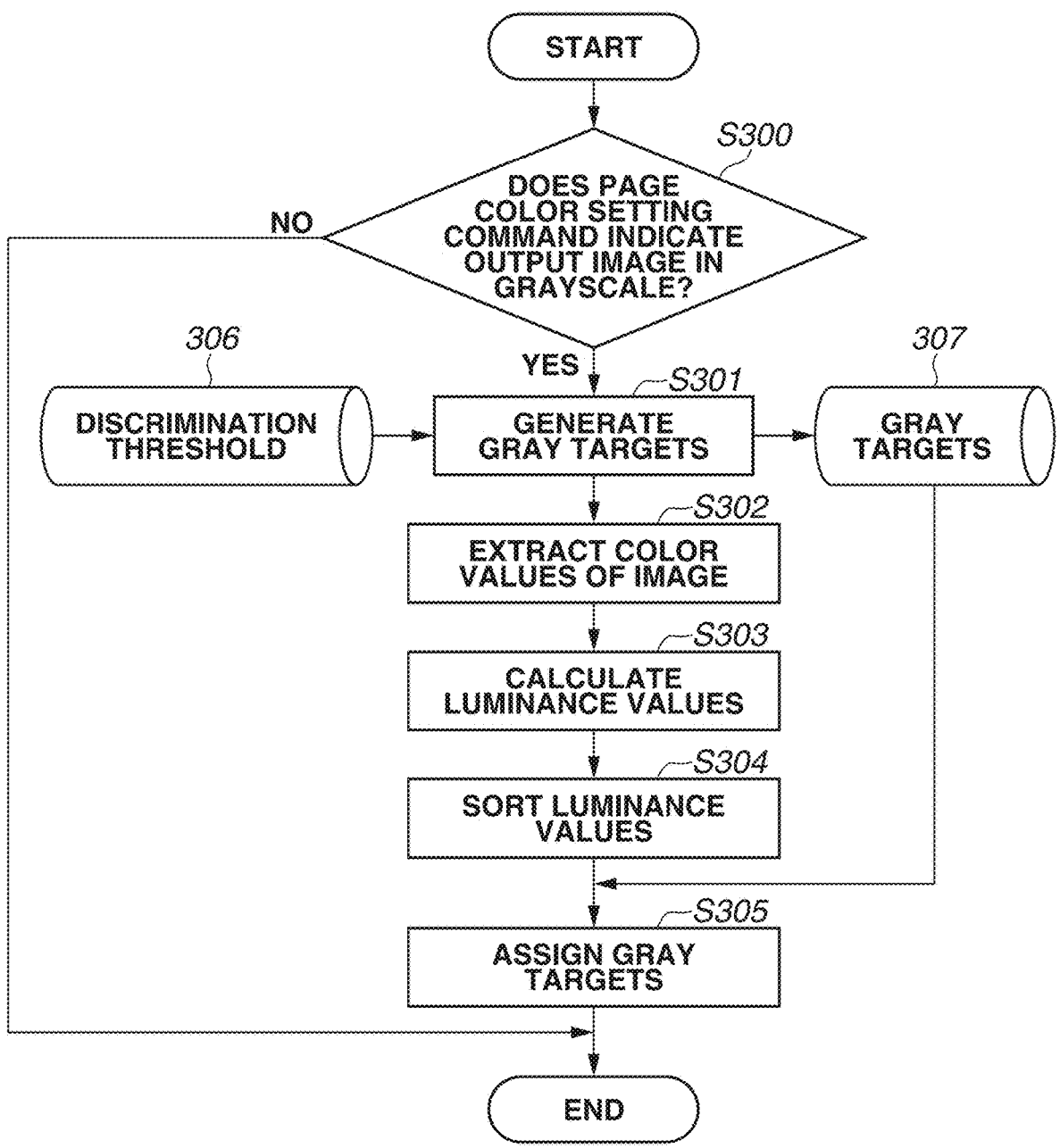

FIG.4A
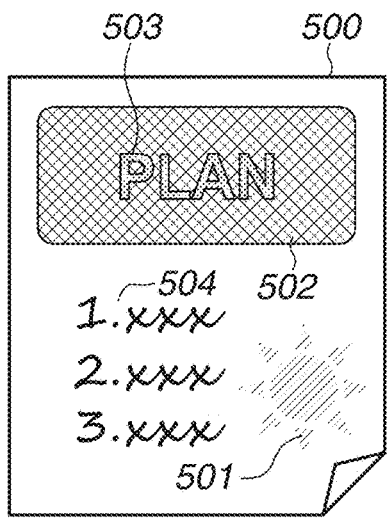
FIG.4B
| INPUT IMAGE | | | |
|---|---|---|---|
| | R | G | B |
| | 255 | 0 | 0 |
| | 146 | 208 | 80 |
| | 255 | 192 | 0 |
FIG.4C
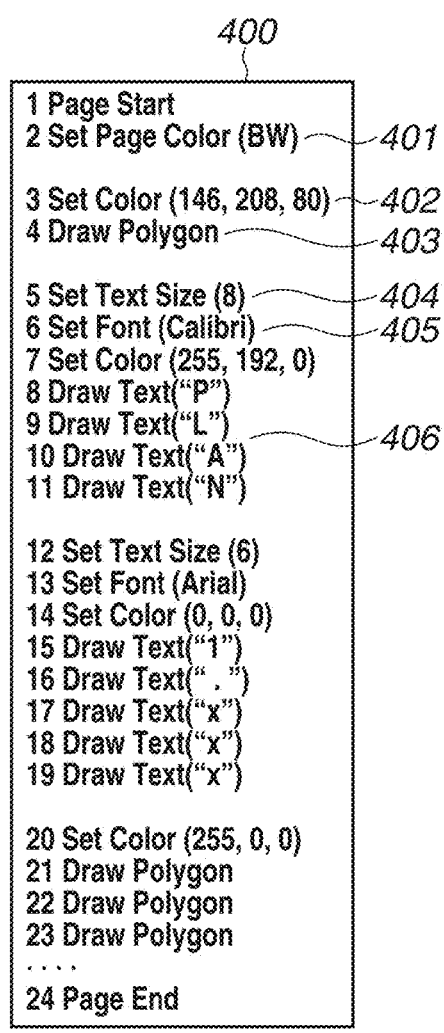
```
1 Page Start
2 Set Page Color (BW)           —401
3 Set Color (146, 208, 80)      —402
4 Draw Polygon                  —403
5 Set Text Size (8)             —404
6 Set Font (Calibri)            —405
7 Set Color (255, 192, 0)
8 Draw Text("P")
9 Draw Text("L")                —406
10 Draw Text("A")
11 Draw Text("N")
12 Set Text Size (6)
13 Set Font (Arial)
14 Set Color (0, 0, 0)
15 Draw Text("1")
16 Draw Text(".")
17 Draw Text("x")
18 Draw Text("x")
19 Draw Text("x")
20 Set Color (255, 0, 0)
21 Draw Polygon
22 Draw Polygon
23 Draw Polygon
. . . .
24 Page End
```

FIG.6A

| COLOR VALUE LIST 700 | | | |
|---|---|---|---|
| Index | R | G | B |
| 1 | 255 | 255 | 255 |
| 2 | 146 | 208 | 80 |
| 3 | 255 | 192 | 0 |
| 4 | 0 | 0 | 0 |
| 5 | 255 | 0 | 0 |

FIG.6B

| COLOR VALUE LIST 701 | | | | LUMINANCE VALUE |
|---|---|---|---|---|
| Index | R | G | B | |
| 1 | 255 | 255 | 255 | 255 |
| 2 | 146 | 208 | 80 | 175 |
| 3 | 255 | 192 | 0 | 189 |
| 4 | 0 | 0 | 0 | 0 |
| 5 | 255 | 0 | 0 | 76 |

FIG.6C

| COLOR VALUE LIST | | | | LUMINANCE VALUE |
|---|---|---|---|---|
| Index | R | G | B | |
| 1 | 255 | 255 | 255 | 255 |
| 3 | 255 | 192 | 0 | 189 |
| 2 | 146 | 208 | 80 | 175 |
| 5 | 255 | 0 | 0 | 76 |
| 4 | 0 | 0 | 0 | 0 |

FIG.6D

| COLOR VALUE LIST 702 | | | | LUMINANCE VALUE | GRAY VALUE |
|---|---|---|---|---|---|
| Index | R | G | B | | |
| 1 | 255 | 255 | 255 | 255 | 255 |
| 3 | 255 | 192 | 0 | 189 | 223 |
| 2 | 146 | 208 | 80 | 175 | 191 |
| 5 | 255 | 0 | 0 | 76 | 159 |
| 4 | 0 | 0 | 0 | 0 | 0 |

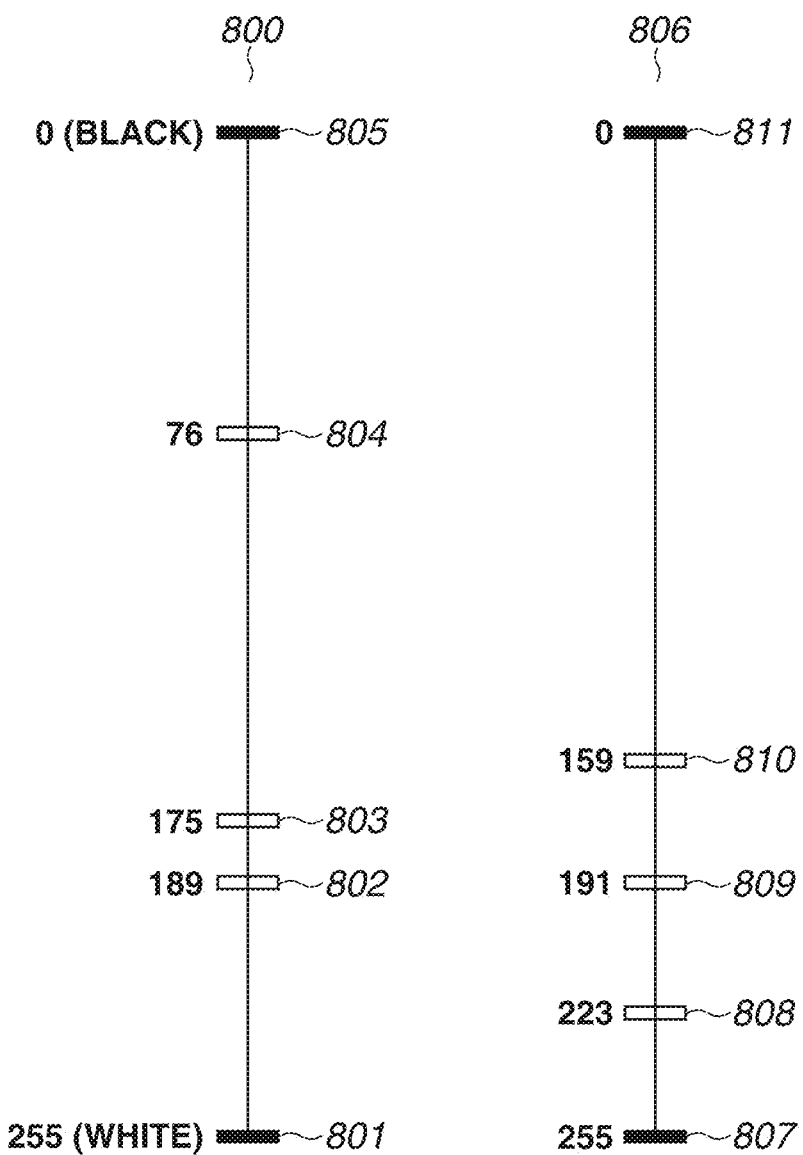

APPARATUS, METHOD, AND STORAGE MEDIUM FOR CONVERTING A COLOR IMAGE TO A MONOCHROME IMAGE

BACKGROUND OF THE INVENTION

Field of the Invention

The aspect of the embodiments relates to an apparatus, a method, and a storage medium.

Description of the Related Art

Image processing apparatuses, which have copy and print functions, have a monochrome print function of printing an image as a monochrome image in printing a color document or color image data. In a case where a color image is printed as a monochrome image, the image processing apparatus converts color data acquired through scanning or color image data transmitted from an external apparatus, such as a personal computer (PC), into grayscale data, and prints the grayscale data. In grayscale conversion processing, colors represented by red, green, and blue (RGB) are converted into grays with different luminance. For example, in National Television System Committee (NTSC) conversion method, which is a known grayscale conversion method, certain weights are assigned to RGB values, and gray signal values corresponding to the RGB values are determined with calculation of $0.299R+0.587G+0.114B$.

However, in a case where color image data includes a plurality of colors, a plurality of RGB values included in the color image data may become the same or close gray signal values through the grayscale conversion. In a case where grayscale signal values obtained through the conversion are the same or similar to each other, it is difficult for a user to discriminate between different levels of gray. In this specification, ease of discrimination between different colors is described as discriminability, and the higher the discriminability becomes, the more easily a user discriminates the colors.

Japanese Patent Application Laid-Open No. 2017-38242 discusses a method for analyzing the number of colors included in color image data and uniformly assigning a gray density with the number of colors used in the color image.

However, with the method discussed in Japanese Patent Application Laid-Open No. 2017-38242, the lightest gray among grays represented by gray signal values to be used after the grayscale conversion may become darker than the lowest gray among grays that are discriminable from white by the user. For this reason, in this method, the amount of toner to be used may increase compared with a case where a grayscale image, in which a difference in density is minimally discriminable for the user after the grayscale conversion, is printed. For example, in a case where the number of colors included in a color image is small, a difference in gray signal values after the conversion may become greater than a difference in signal values necessary for a human to discriminate between colors (different levels of gray).

SUMMARY OF THE INVENTION

An apparatus includes at least one controller, having at least one processor which executes instructions stored in at least one memory, being configured to, convert a color of a first object into gray having first brightness and a color of a second object into gray having second brightness lower than the first brightness by a fixed value in response to receiving color data including the first object and the second object, and output gray data based on the first brightness of gray into which the color of the first object is converted and the second brightness of gray into which the color of the second object is converted.

Further features of the disclosure will become apparent from the following description of exemplary embodiments with reference to the attached drawings.

BRIEF DESCRIPTION OF THE DRAWINGS

FIG. 3 is a flowchart illustrating a flow of processing according to a first exemplary embodiment.

FIG. 4A is a diagram illustrating an example of a color image to be generated by a printer application. FIG. 4B is a table indicating colors in respective areas of the color image. FIG. 4C is a diagram illustrating an example of a rendering command according to the present exemplary embodiment.

FIG. 6A is a diagram illustrating an example of a color value list according to the first exemplary embodiment. FIG. 6B is a diagram illustrating an example of the color value list and luminance values. FIG. 6C is a diagram illustrating an example of a color value list and luminance values after sorting in descending order of luminance FIG. 6D is a diagram illustrating an example of a list where the color value list is associated with gray values of gray targets.

FIG. 7A is a diagram schematically illustrating gray values in a case where conversion is performed by using a National Television System Committee (NTSC) method. FIG. 7B is a diagram schematically illustrating gray values in a case where conversion in the first exemplary embodiment is performed.

DESCRIPTION OF THE EMBODIMENTS

A first exemplary embodiment of the disclosure will be described below with reference to the accompanying drawings.

<Image Forming Apparatus>

Figure 1:
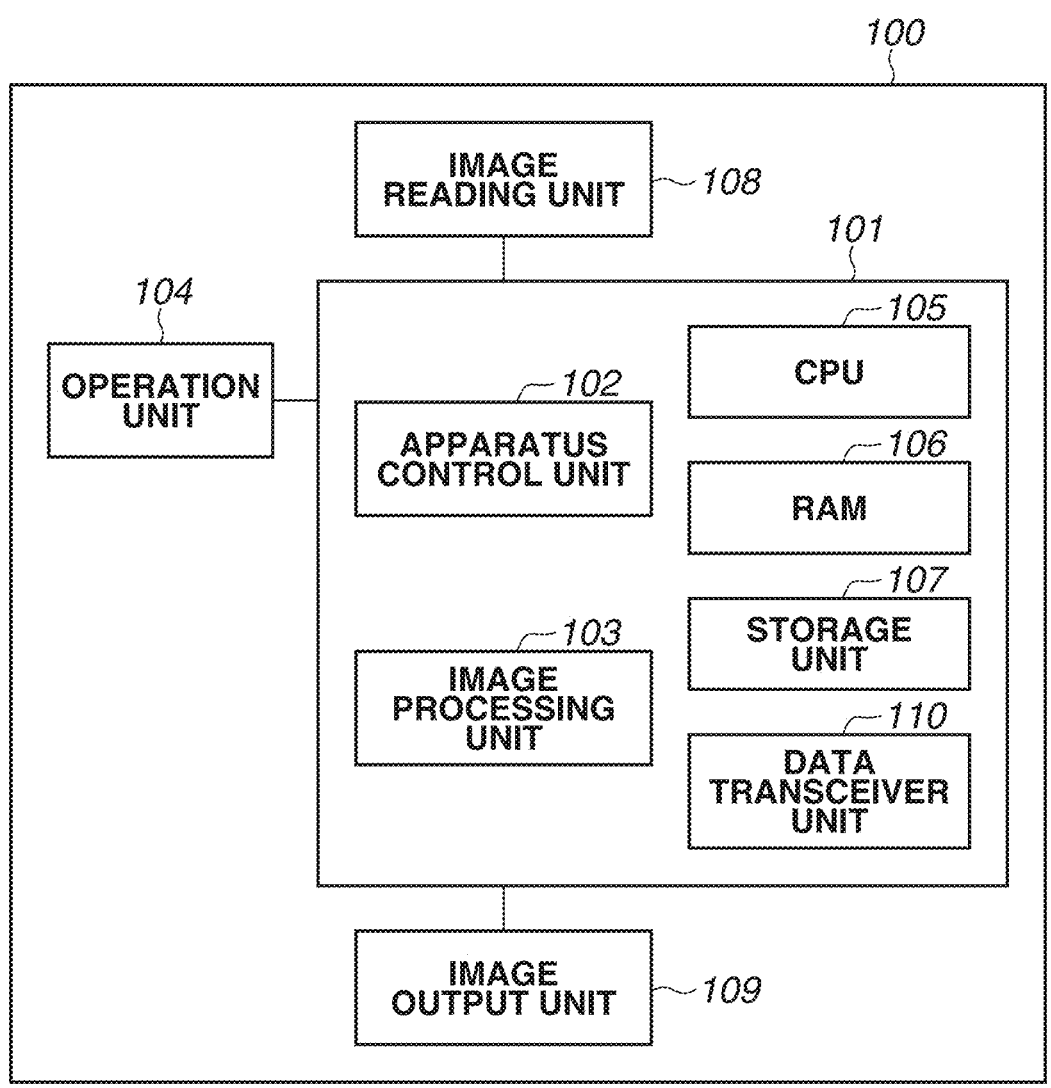
FIG. 1 is a block diagram illustrating a configuration of an image forming apparatus according to an exemplary embodiment.

An image forming apparatus 100, which is an example of an image processing apparatus according to the aspect of the embodiments, is, for example, a multi-function peripheral (MFP) where a plurality of functions, such as a scanning function and a printer function, are integrated. FIG. 1 is a block diagram illustrating the image forming apparatus 100 according to the present exemplary embodiment. The image forming apparatus 100 includes a control unit 101. The control unit 101 centrally controls the image forming apparatus 100, and includes a central processing unit (CPU) 105, a random access memory (RAM) 106, a storage unit 107, a device control unit 102, an image processing unit 103, and a data transceiver unit 110.

The CPU 105 loads programs, stored in the storage unit 107, into the RAM 106, and executes the programs to control operations of the image forming apparatus 100. The RAM 106, which is a temporary storage memory, can temporarily store image data and programs. The storage unit 107, which is, for example, a hard disk, stores parameters for controlling the image forming apparatus 100, applications, programs, and an operating system (OS) for implementing control according to the present exemplary embodiment. The device control unit 102, which is a device controller, controls units connected to the control unit 101, such as an operation unit 104, an image reading unit 108, and an image output unit 109. The data transceiver unit 110 is a module that controls transmission and reception of image data to and from an external apparatus, such as a network interface controller (NIC, not illustrated). The image forming apparatus 100 is connected to an external apparatus (not illustrated), such as a personal computer (PC) and a facsimile, via a network, such as the Internet, or a public telephone line. The image forming apparatus 100 receives image data from the external apparatus to perform printing based on the received image data using the image output unit 109, and transmits image data, which has been acquired by the image reading unit 108 reading a document, to the external apparatus.

The image reading unit 108 is, for example, a scanner. The CPU 105 executes the programs loaded in the RAM 106 to read a document, thus generating image data.

The image output unit 109 is, for example, a printer. The CPU 105 executes the above-described program to carry out an output function for outputting an image to a recording medium, such as a sheet, and a monitor via the image output unit 109. The image processing unit 103, for example, reads image data stored in the storage unit 107, optimizes the image data based on the parameters, and executes image processing based on setting information notified from the operation unit 104.

The operation unit 104 includes a touch panel and hardware keys. The operation unit 104 accepts an instruction and a setting operation from a user, and displays apparatus information about the image forming apparatus 100, progress information about jobs, and various user interface images. The setting information, etc. accepted by the operation unit 104 is stored in the storage unit 107 via the device control unit 102. The image forming apparatus 100 suitably includes blocks necessary for executing the functions of the image forming apparatus 100 besides the block illustrated in FIG. 1.

<Print Processing>

Figure 2:
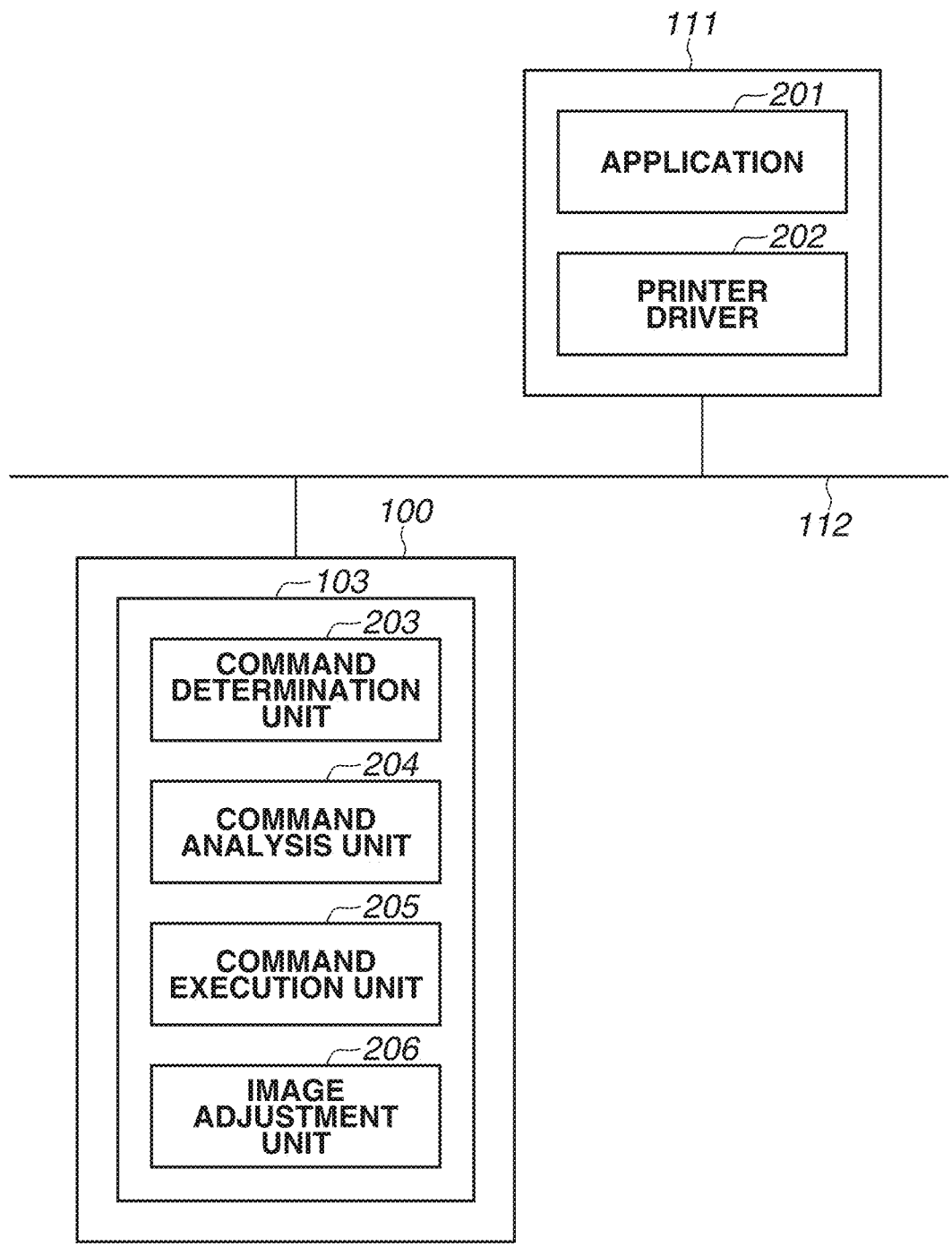
FIG. 2 is a schematic diagram illustrating the image processing apparatus and software blocks of an information processing apparatus according to an exemplary embodiment.

FIG. 2 is a diagram illustrating a flow of print processing in the image forming apparatus 100 according to the first exemplary embodiment. The present exemplary embodiment will be described with a print job, as an example, where an external apparatus 111, such as a PC, inputs image data into the image forming apparatus 100 via a network 112 and the image output unit 109 performs printing based on the image data. An application 201 and a printer driver 202 are software modules included in the external apparatus 111. A command determination unit 203, a command analysis unit 204, a command execution unit 205, and an image adjustment unit 206 are software modules included in the image processing unit 103 in the image forming apparatus 100.

The application 201, which is included in the external apparatus 111, generates a document and a presentation material. Colors included in image data generated by the application 201 are represented by signal values of red, green, and blue (RGB). In the present exemplary embodiment, an example case will be described where the application 201 represents colors included in image data using RGB values. However, the application 201 may generate image data where colors included therein are represented by cyan, magenta, yellow, and black (CMYK) values.

The printer driver 202 is a software module included in the external apparatus 111. The printer driver 202 converts image data generated by the application 201 into page description language (PDL) data and outputs the PDL data to the image forming apparatus 100. The PDL data will be described below with reference to FIGS. 4A to 4C. The PDL data generated by the printer driver 202 is sent to the image forming apparatus 100 and is printed.

The PDL data output from the printer driver 202 is input into the data transceiver unit 110 of the image forming apparatus 100 via the network 112. The PDL data input into the data transceiver unit 110 is input into the image processing unit 103, and is processed by the respective software modules.

The command determination unit 203 determines a type of received PDL data. The PDL type includes PostScript (PS) and Printer Command Language (PCL).

The PDL data the command type of which has been determined by the command determination unit 203 is input into the command analysis unit 204. The image processing unit 103 includes the command analysis unit 204 for each command type. The command analysis unit 204 that corresponds to the command type determined by the command determination unit 203 extracts a command of the PDL data and analyzes the command. In a case where the received PDL data includes an instruction for printing the image in grayscale, the command analysis unit 204 executes gray conversion processing on the received PDL data.

The command execution unit 205 generates a raster image based on an analyzed result obtained by the command analysis unit 204. The image adjustment unit 206 performs image processing, such as color conversion and filtering, on the raster image.

The functions of the command determination unit 203, the command analysis unit 204, the command execution unit 205, and the image adjustment unit 206 of the image processing unit 103 illustrated in FIG. 2 are implemented by the CPU 105 executing the above-described programs in the present exemplary embodiment.

<Gray Conversion Processing>

Gray-scale conversion processing will be described below with reference to FIG. 3 and FIGS. 4A, 4B, and 4C. In the present exemplary embodiment, the following grayscale conversion processing is executed in a case where a user sets grayscale print via the printer driver 202.

FIG. 3 is a flowchart illustrating the grayscale conversion processing according to the present exemplary embodiment. The processing illustrated in the flowchart of FIG. 3 is implemented by the CPU 105 loading the program stored in the storage unit 107 into the RAM 106 and executing the loaded program to function as the command analysis unit 204. The flowchart illustrated in FIG. 3 represents processing to be executed by the command analysis unit 204 after the command determination unit 203 completes determining the type of command.

FIG. 4A illustrates a color image 500 which is generated by the printer application 201. FIG. 4B illustrates a table indicating colors of respective areas on the color image 500.

FIG. 4C is a schematic diagram illustrating PDL data 400 generated by the printer driver 202 based on the color image 500.

In FIG. 4A, an object 501 is an area to be rendered with R=255, G=f 0, and B=0 as indicated in a row 506 of the table. An object 502 is an area to be rendered with R=146, G=208, and B=80 as indicated in a row 507 of the table. An object 504 is an area to be rendered with R=255, G=192, and B=0 as indicated in a row 508 of the table. In a case where a user instructs the printer driver 202 to print the image illustrated in FIG. 4A with the grayscale conversion, the PDL data 400 illustrated in FIG. 4C is generated. In the present exemplary embodiment, the command analysis unit 204 of the image forming apparatus 100 analyzes the PDL data 400, generates image data which has been subjected to the grayscale conversion, and performs printing.

In step S300, the command analysis unit 204 initially determines whether a page color setting command included in the PDL data 400 indicates outputting of a grayscale image. Specifically, the command analysis unit 204 refers to a color mode setting command 401 in the PDL data 400 and analyzes whether an image to be output is a color image or a grayscale image. The command "Set Page Color (BW)" set in the color mode setting command 401 is used for a command for instructing output of a grayscale image (YES, in step S300). Thus, the processing proceeds to step S301 under the control of the command analysis unit 204. In step S300, if the color mode setting command 401 is a command for instructing output of a color image, such as "Set Page Color (CL)", (NO, in step S300), the command analysis unit 204 ends the processing illustrated in FIG. 3.

In step S301, the command analysis unit 204 generates gray targets 307 using a discrimination threshold 306 stored in the storage unit 107, and stores the gray targets 307 in the RAM 106. The gray targets indicate candidates for gray signal values to be used for converting colors included in color image data into grayscale. Hereinafter, the gray signal values are described as gray values. The image forming apparatus 100 prints an image on a sheet based on the gray values with black toner. The discrimination threshold 306 is a value, which is stored in, for example, the storage unit 107 in advance, and indicates a difference in gray values necessary for a user to discriminate between grays having different densities. In step S301, the command analysis unit 204 executes gray target generation processing, and saves, in the RAM 106, signal values of the gray targets which have been set so that differences among the signal values become predetermined values. The gray targets 307 illustrated in FIG. 3 are each a signal value of respective gray targets saved in the RAM 106 in step S301.

Figure 5A:
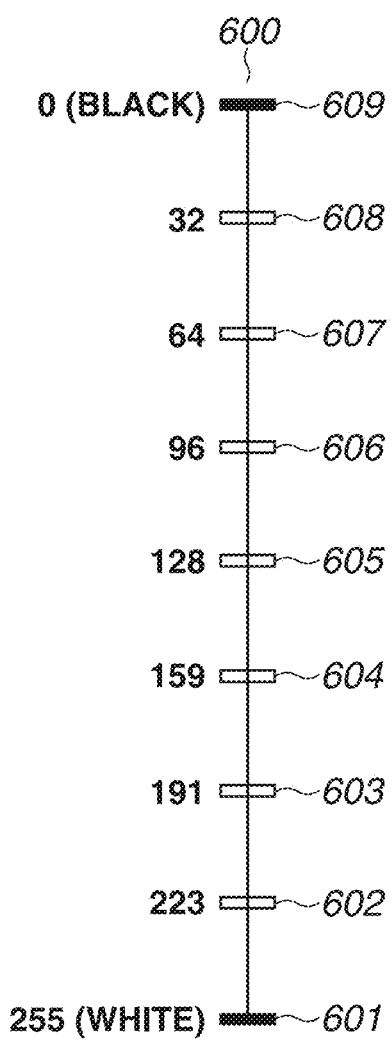
FIG. 5A is a diagram illustrating an example of gray signal values of gray targets.

Gray targets 600 illustrated in FIG. 5A have a plurality of gray targets 602 to 608 in addition to signal values of a gray target (white) 601 and a gray target (black) 609 between signal values of 0 to 255 in an 8-bit gray image inclusive. All the intervals between the gray targets 602 to 608 are set to be greater than or equal to the discrimination threshold 306. The discrimination threshold 306 and process of generating gray target in step S301 will be described in detail below. In the present exemplary embodiment, gray targets are generated in a case where the command to output an image in grayscale is received. The CPU 105 may execute the processing in step S301 at a predetermined timing, such as activation of the image forming apparatus 100, to generate the gray targets 307, and store the gray targets 307 in the storage unit 107. In this case, before executing the processing in step S302 and subsequent operations, the CPU 105 loads the gray targets 307 stored in the storage unit 107 into the RAM 106 and uses the gray targets 307.

In step S302, the command analysis unit 204 extracts color values specified by a color setting command 402 included in the PDL data 400, and generates a color value list 700 illustrated in FIG. 6A. The command analysis unit 204 extracts the color setting command 402 from the PDL data 400 illustrated in FIG. 4A. A command described on the third line of the PDL data 400 indicates that an object described on the fourth line is to be rendered with R=146, G=208, and B=80. Further, a color setting command described on the seventh line of the PDL data 400 indicates that the texts on the eighth to eleventh lines are rendered with R=255 G=192, and B=0. The command analysis unit 204 extracts color setting commands and generates the color value list 700 illustrated in FIG. 6A.

The color value list 700 holds indexes and RGB values for color values extracted by the command analysis unit 204, and is stored in the RAM 106. The command analysis unit 204 analyzes a rendering command line by line from the first line, and adds RGB values specified by the color setting command 402 to the color value list 700. In a case where the RGB values extracted by the command analysis unit 204 have been stored in the color value list 700, the command analysis unit 204 does not add these RGB values to the color value list. After the color value list 700 of the color image 500 is completed, the CPU 105 stores the color value list 700 in the RAM 106.

In step S303, the command analysis unit 204 reads the color value list 700 stored in the RAM 106, calculates a luminance value 701 for respective color values, and stores the luminance values 701 in the RAM 106. The command analysis unit 204 sets, for example, a brightness value represented by a gray value obtained through the above-described NTSC conversion, as a luminance value 701. For example, in a case where the color of index 2 is subjected to the NTSC conversion, 0.299×146+0.587×208+0.114× 80=175. Alternatively, an L value obtained by converting RGB values into a general color space, such as a Lab color space or an Lch, or any other values that are indexes of brightness may be used. The command analysis unit 204 stores, in the RAM 106, the luminance values 701 obtained through the above method in association with the indexes and the color values of respective colors. FIG. 6B is a diagram illustrating an example of the color value list 700 and the luminance values 701 stored in the RAM 106 in step S303.

In step S304, the command analysis unit 204 reads the color value list 700 and the luminance values 701 stored in the RAM 106, and sorts the values in the color value list 700 in descending order of brightness (or darkness), i.e., in descending or ascending order of luminance value 701. FIG. 6C illustrates the color value list 700 and the luminance values 701 after the sorting in step S304. In the present exemplary embodiment, the color value list 700 are sorted in descending order of luminance value 701, that is, in the order from the lightest gray.

In step S305, the command analysis unit 204 assigns gray targets, sequentially in descending order of gray value thereof, that is, from the gray target corresponding to the lightest gray to the gray target corresponding to the darkest gray, to the colors registered in the color value list 700 sequentially in descending order of luminance value 701. FIG. 6D is a list where the command analysis unit 204 associates the respective colors registered in the color value list 700 with the gray values of gray targets. Gray values described in a gray value 702 are stored as gray targets in the RAM 106, and gray targets are assigned one by one sequentially, from the gray target corresponding to the lightest gray (the gray target with the highest gray value), to the colors, one by one sequentially in descending order of the luminance value 701. For example, a value of the gray target 601 is assigned to white in Index 1 which is the first brightest, a value of the gray target 602 is assigned to a color in Index 3 which is the second brightest, and a value of the gray target 603 is assigned to a color in Index 2 which is the third brightest. Further, a value of the gray target 604 is assigned to a color in Index 5 which is the fourth brightest, and a value of the gray target 609 is assigned to black in Index 4 which is the darkest. In a color image, black is often used for characters. The gray target 609 as black is assigned to a portion which is black before the grayscale conversion, with the portion not being converted into another gray value, because light-colored characters cause difficulty in readability. However, a value of the gray target 605 may be assigned to black in Index 4 so that a toner consumption amount is further decreased.

Referring now to FIGS. 7A and 7B, a description will be provided of an effect of controlling a toner consumption amount while maintaining discriminability, which is produced by the gray conversion using the method according to the present exemplary embodiment. FIGS. 7A and 7B are diagrams schematically illustrating gray values to be assigned to respective colors when the grayscale conversion is performed on the color image 500 through two different methods.

FIG. 7A is a diagram schematically illustrating gray values 800 in a case where the conversion is performed by using the NTSC method. FIG. 7B is a diagram schematically illustrating gray values 806 in a case where the conversion is performed by using the method according to the present exemplary embodiment. The gray values 800 in the case where the conversion is performed by using the NTSC method match the values in the luminance value 701 in FIG. 6B, 6C, or 6D. Indicating of the gray values in the luminance value 701 in FIG. 6B, 6C, or 6D on the gray values 800, results in gray values 801 to 805. On the other hand, the gray values 806 in the case where the conversion is performed by using the method according to the present exemplary embodiment are those in the gray value 702 in FIG. 6D. These gray values in the gray value 702 are indicated by gray values 807 to 811.

In the conventional method, the gray values 802 and 803 correspond to, respectively, luminance values 701 of 189 and 175, which are very close to each other. In such a case, when the gray values are close to each other after the grayscale conversion, it is difficult for a user to discriminate between portions which have been rendered with grays having different signal values. Thus, the discriminability drops.

Gray values obtained by respective RGB values being converted are now compared. For example, converting R=146, G=208, and B=80 into gray values with the conventional method results in gray with a luminance value of 175 which is indicated by gray value 803 in FIG. 7A. On the other hand, converting the same RGB values into gray values with the method according to the present exemplary embodiment results in gray with a luminance value of 223 which is indicated by the gray value 808 in FIG. 7B. In such a manner, in the case where the grayscale conversion is performed by using the method according to the present exemplary embodiment, an RGB color is converted into light gray having a higher luminance value than that obtained through the grayscale conversion using the NTSC conversion method. Similarly, the gray values 803 and 804 in FIG. 7A are converted into higher gray values 809 and 810 in the grayscale conversion using the method according to the present exemplary embodiment. In the method according to the present exemplary embodiment, in a case where a color image is subjected to the grayscale conversion, an amount of toner to be used can be reduced compared with the case of using the conventional method. Assigning of the gray targets 600 one by one sequentially in descending order of gray value, that is, from the gray target corresponding to the lightest gray, enables a reduction in toner consumption amount while maintaining the discriminability between grays with different gray values.

<Process of Generating Gray Target>

Figure 5B:
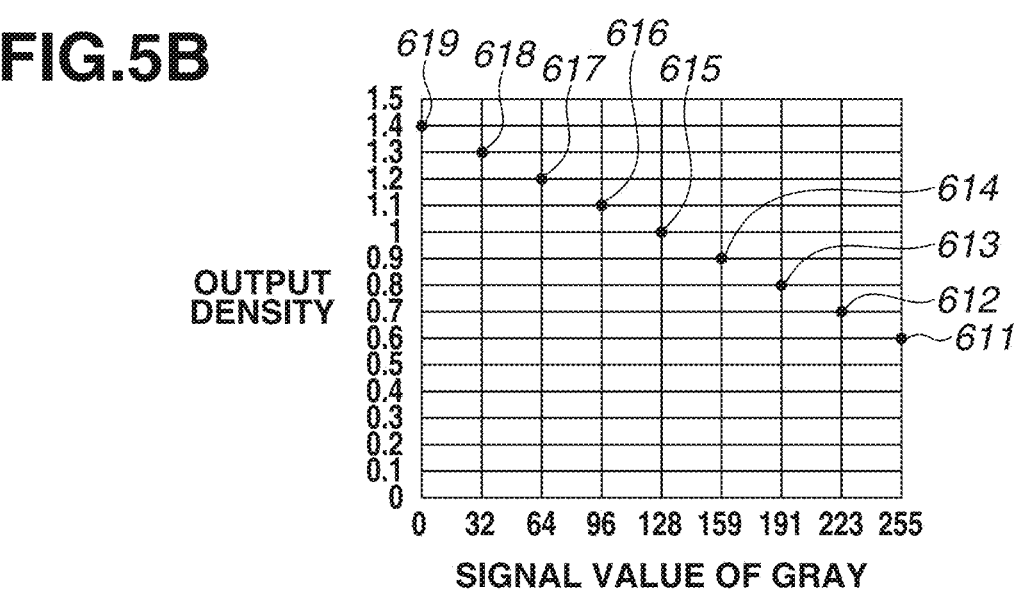
FIG. 5B is a diagram illustrating a relationship between the gray signal values and output densities.

The process of generating a gray target in step S301 will be described in detail below with reference to FIG. 5B. An output characteristic of a printer according to the present exemplary embodiment is such that, as illustrated in FIG. 5B, the density is higher (lower) proportionately with gray signal values. A relationship between the signal value and the output density of the image forming apparatus 100 is stored in the storage unit 107 which is measured by a measurement device before factory-shipment of the image forming apparatus 100. The output density herein is a value obtained based on a ratio between reflected light intensity and incident light intensity of light with which an object, which has been printed onto a sheet with respective gray signal values, is irradiated. The density of paper white is a value obtained based on a ratio between reflected light and incident light obtained by a specific sheet being irradiated with light using a measurement device.

In the present exemplary embodiment, the density to be set as a discrimination threshold necessary for a human to discriminate between different colors is 0.1. The value to be set as the discrimination threshold is preset before factory-shipment and is set to either output density or a gray value. In the present exemplary embodiment, before factory-shipment, a maximum output density of the image forming apparatus 100, a paper white density obtained by density of a predetermined sheet being measured, and the output density to be set as the discrimination threshold are stored as the discrimination threshold 306 in the storage unit 107. In step S301, the command analysis unit 204 calculates an output density corresponding to respective gray targets using the above values stored in the storage unit 107, and converts the output densities into gray signal values.

For example, in a case where a sheet with a paper white density of 0.6 is used in the image forming apparatus 100 where a maximum black density is 1.4, a gray density which can be implemented by the image forming apparatus 100 ranges from 0.6 to 1.4. In a case where the discrimination threshold is set to 0.1 regardless of the density range, a command analysis unit 204 sets a total of 9 levels of output density of the gray targets for the output densities of 0.6 to 0.1, where the respective levels are set for every 0.1 output density. That is, a density of 0.7 is assigned to the gray target 602, whose density is separated by 0.1 from the gray target 601, and density of 0.8 is assigned to the gray target 603, whose density is separated by 0.1 from the gray target 602.

The command analysis unit 204 assigns the maximum output density of 1.4 to the signal value of 255 and the paper white density of 0.6 to the signal value of 0. The command analysis unit 204 converts the output densities for the residual gray targets into signal values. As a result, as illustrated in FIG. 5A, the gray signal values are set for the respective gray targets. The command analysis unit 204 stores the gray signal values in the RAM 106.

In the present exemplary embodiment, the gray targets are set at equal intervals. However, the setting of the gray targets is not always limited to this manner. For example, in a case where the discriminability varies in density ranges, the intervals of the gray values of the gray targets may be varied in the density range. For example, the discrimination threshold may be set to be smaller for a density range where the gray density is lower, and the discrimination threshold may be set to be greater in a density range where the gray density is higher. In a case where the output characteristic of the image forming apparatus 100 is a non-linear shape, the discrimination threshold may be varied for respective gray targets based on the output characteristic. A difference in the output density or a difference in the gray value of gray targets whose densities are close to each other out of a plurality of gray targets to be generated may be the discrimination threshold or more. Setting the differences between the gray targets to the same values as the discrimination threshold prevents the intervals of the gray targets from being longer than necessary.

The intervals of all the gray targets 600 may be set to be slightly longer than the discrimination threshold 306. Any other setting methods may be applicable as long as the gray targets 600 can be set to be separated from each other by the discrimination threshold 306 or more. In the description, the discrimination threshold 306 is defined in terms of density but can be defined in terms of, for example, luminosity, luminance, and gray signal values. The number of gray targets is nine in this description but is not limited to this. The maximum settable number of the gray targets 600 can be set after the above conditions are satisfied.

Difference(s) in the gray signal value necessary for a human to discriminate between grays having different densities may be stored in the storage unit 107 in advance. The command analysis unit 204 generates the gray target 602 whose signal value is separate from a gray signal value of 0, corresponding to white, by the discrimination threshold stored in the storage unit 107. The command analysis unit 204 further generates the gray target 603 whose signal value is separate from the signal value of the gray target 602 by the discrimination threshold stored in the storage unit 107. In this way, the command analysis unit 204 sets signal values of gray targets one by one from the gray target corresponding to the lightest gray, and generates gray targets until generation of a gray target having a gray signal value corresponding to black.

In the first exemplary embodiment, in executing the grayscale conversion processing illustrated in FIG. 3, chromatic colors included in color image data are associated one by one with the gray targets generated by using the method illustrated in FIGS. 5A and 5B one by one from the lightest gray target, to be converted. This generates grayscale image data having gray densities, in order from white, separate from each other by minimum necessary intervals. If a grayscale image is printed based on the grayscale image data generated by using the above method, the toner consumption amount can be reduced in the monochrome print of a color image while discriminability is maintained.

A second exemplary embodiment of the disclosure will be described below. The first exemplary embodiment has been described with an example where the number of colors included in color image data is less than the number of gray targets as an example. In the present exemplary embodiment, a description will be provided of a grayscale conversion method in a case where the number of colors extracted from color image data is greater than the number of the gray targets 600.

Figure 8:
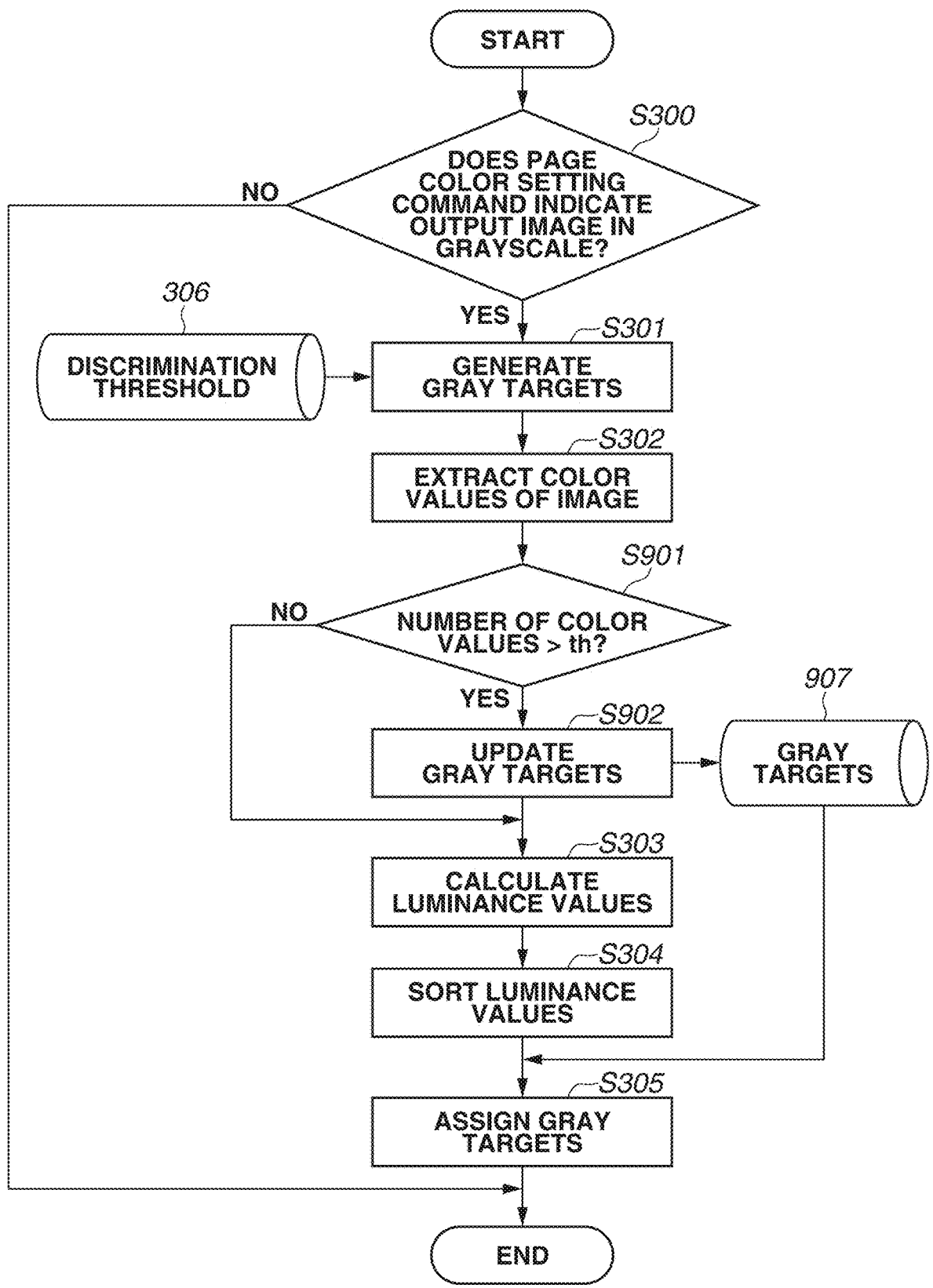
FIG. 8 is a flowchart illustrating grayscale conversion processing according to a second exemplary embodiment.

FIG. 8 is a flowchart illustrating grayscale conversion processing according to the present exemplary embodiment. The processing illustrated in this flowchart is executed by the CPU 105 loading a program stored in the storage unit 107 into the RAM 106 and executing the loaded program. As described above, a description will be provided assuming that the grayscale conversion processing according to the present exemplary embodiment is executed by the CPU 105 functioning as the command analysis unit 204. In the processing illustrate in FIG. 8, operations similar to those in the processing of FIG. 3 are denoted by the same step numbers. Herein, only operations different from those of FIG. 3 will be described.

In step S901, the command analysis unit 204 reads the color value list 700 saved in the RAM 106 to acquire the number of colors corresponding to color values, and determines whether the number of colors stored in the color value list 700 is greater than a threshold th. In the present exemplary embodiment, the threshold th indicates the number of the gray targets generated in step S301.

In the present exemplary embodiment, if the number of the gray targets acquired in step S901 is greater than the threshold th (Yes in step S901), the processing proceeds to step S902. In step S902, the command analysis unit 204 updates the gray targets. A method for updating the gray targets will be described below with reference to FIGS. 9A, 9b, and 9C. The generated new gray targets 907 are stored in the RAM 106.

In step S901, if the acquired number of colors corresponding to the color values is the threshold th or less (No in step S901), the command analysis unit 204 does not update the gray targets in step S902 and executes the operation in step S303. In the present exemplary embodiment, the command analysis unit 204 determines whether the number of colors extracted from the color image data is greater than the threshold. If greater, the method for generating gray targets is changed. As a result, even if many colors are included in color image data, grayscale image data can be generated by using a method different from the grayscale conversion using weighting.

<Updating Gray Target>

If the number of colors corresponding to color values exceeds the threshold th which is the number of colors of the gray targets 600, the number of the gray targets generated in step S301 is insufficient for the colors included in the color image.

Figure 9A:
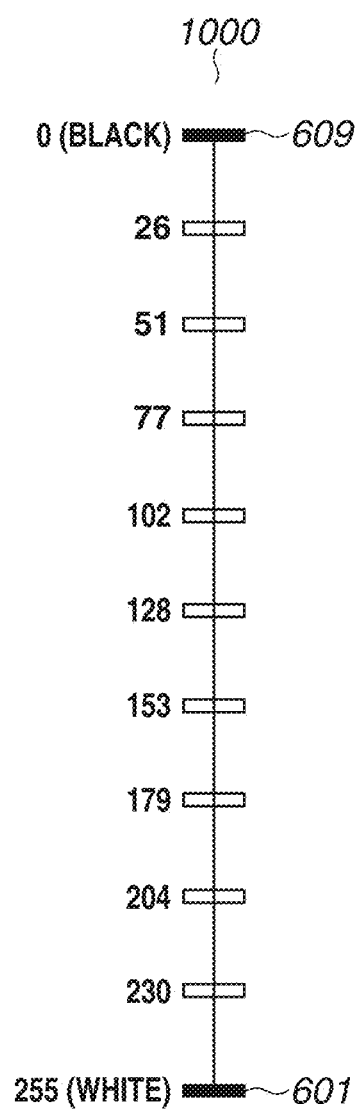
FIGS. 9A, 9B, and 9C are schematic diagrams illustrating examples of gray targets to be generated in the second exemplary embodiment.
Figure 9B:
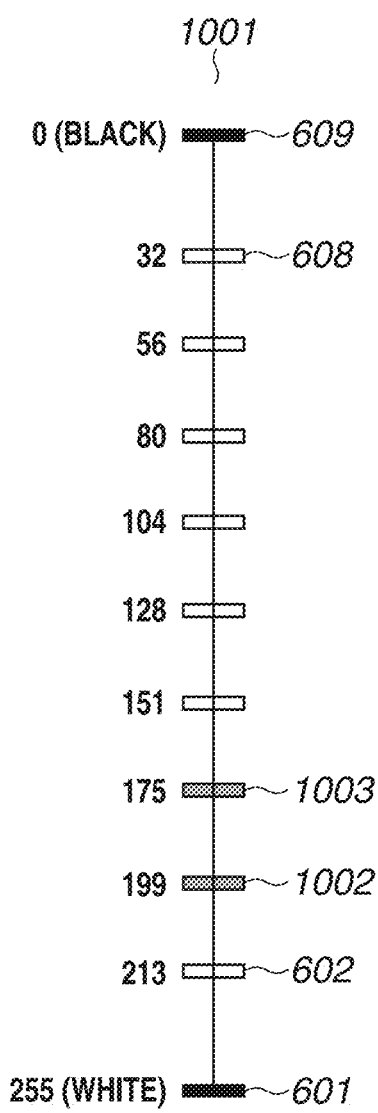
Figure 9C:
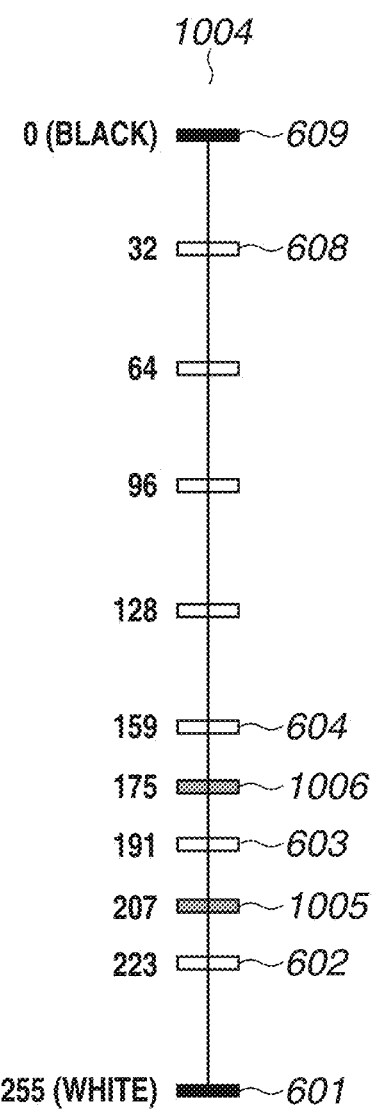

Thus, in the present exemplary embodiment, in a case where the number of colors included in a color image exceeds the number of gray targets generated in advance, the gray targets are updated by using methods illustrated in the schematic diagrams of FIGS. 9A, 9B, and 9C illustrating gray targets 1000, 1001, and 1004. In the present exemplary embodiment, gray targets are generated by using any one of three methods described below. A predetermined one of the methods may be used, or a user may select any one of the methods for gray target conversion processing out of the following three methods.

In the present exemplary embodiment, a case will be described as an example where the threshold th is 9 and the number of colors corresponding to the color values extracted in step S302 is 11. FIGS. 9A, 9b, and 9C illustrate the gray targets 907 for eleven colors after updating in step S902. As in the description of the generation of the gray targets in the first exemplary embodiment, a description will be provided assuming that the discrimination threshold 306 is defined as density of 0.1, a reproduction density of the printer ranges from 0.6 to 1.4, and that a printer characteristic 610 is a linear density.

The first method for the gray target updating processing in step S902 is equally setting gray values of 0 to 255 based on the number of colors included in a color image. In the gray targets 1000 illustrated in FIG. 9A, the respective gray targets are set so that the intervals therebetween are equal. As to the printer characteristic 610, the gray values between the gray target 601 and the gray target 609 are set at equal intervals. That is, the gray targets 1000 is formed by 10 equal divisions of the interval between the signal value of 0 and the signal value of 255. Thus, the gray values of the targets between the gray target 601 and the gray target 609 are 230, 204, 179, 153, 128, 102, 77, 51, and 26, in this order.

The second method for updating the gray targets in step S902 is a method for arranging remaining gray targets without changing the gray target 602, which is closest to white, and the gray target 608, which is closest to black. In the second method, the command analysis unit 204 arranges gray targets, into which the colors other than white and black are converted, at equal intervals between the gray target 602 and the gray target 608. In this case, the gray signal values of the gray targets 602 and 608 are 223 and 32, respectively, as in the gray targets 600. The remaining gray targets each become the corresponding one of eight equal divisions of the interval between the gray signal value 223 to the gray signal value 32 between the gray target 602 and the gray target 608. Thus, a gray signal value for a gray target 1002 becomes 199, and a gray signal value for a gray target 1003 becomes 175. Some intervals between the gray targets are narrower than the intervals in the gray targets 1000, but this method is beneficial in that discriminability between the gray value for the lightest gray which corresponds to the gray target 602 and paper white can be ensured, and that black text and a background can be securely discriminated even in a case where the black text is superimposed on the dark background.

The third method for processing of updating gray targets in step S902 is a method illustrated in FIG. 9C. In FIG. 9C, new gray targets are set between the gray targets generated in step S301 without changing the gray targets generated in step S301.

For example, in the gray targets 1004 in FIG. 9C, the gray targets 600 for nine colors illustrated in FIGS. 5A and 5B are not changed, but additional gray targets 1005 and 1006 for two colors are set between the light gray targets 602 and 603 and between 603 and 604. Thus, a gray value of the gray target 1005 is 207, which is at the midpoint between 223 and 191, and a gray value of the gray target 1006 is 175, which is at the midpoint between 191 and 159. Adding gray targets from one corresponding to light gray can minimize an increase in toner consumption amount compared with the case using the gray targets 600. The method in FIG. 9C makes it possible to execute the grayscale conversion processing with the toner consumption amount being reduced.

In the updating of gray targets in step S903, a determination as to whether a premium is placed on discriminability or on the toner consumption amount for gray targets 907 to be generated may be made in advance. Alternatively, the device control unit 102 may store a setting made with the operation unit 104 in the RAM 106, and the CPU 105 may switch between them based on the setting in generating the gray targets 600. Alternatively, the command analysis unit 204 may determine a setting made with the printer driver 202, and the CPU 105 may switch them based on the setting. Yet alternatively, if the number of colors included in the color image is greater than the threshold th (Yes in step S901), in step S902, a user may set whether the grayscale conversion processing is executed by using gray targets. In a case where the grayscale conversion processing is not executed by using gray targets if the number of colors included in the color image data is greater than the threshold th, the image forming apparatus 100 executes the grayscale conversion processing using a weighting method, such as the NTSC method.

Performing the above processing enables the grayscale conversion processing to be executed while preventing or reducing degradation in discriminability due to gray values which are the same or close to each other after the grayscale conversion even if the number of extracted colors is greater than the number of the gray targets 600.

In the above exemplary embodiments, a case has been provided where the image forming apparatus 100 executes the grayscale conversion processing on color image data generated by an external apparatus and prints the converted image data. In the copy job in grayscale, in a case where the grayscale conversion is performed on the image data read as a color image by the image reading unit 108, the above-described grayscale conversion processing may be executed. In a transmission job for performing the grayscale conversion on color image data generated by the image reading unit 108 reading a document, and transmitting the converted image data as grayscale image data to an external apparatus, the above-described grayscale conversion processing may be executed.

In the above exemplary embodiments, gray targets are first generated, and then RGB values extracted from the color image data are converted into gray signal values. Alternatively, the RGB values may be extracted from the color image data, and the same number of gray targets as the number of the extracted colors may be generated. In this case, the command analysis unit 204 sets, as gray having the lowest density, a gray signal value that is different from a signal value corresponding to white by the discrimination threshold, and generates the same number of gray targets as the number of the extracted colors.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above configuration enables a reduction in the amount of toner to be used for print while enabling individual grays having different densities to be easily discriminable in converting a color image into a grayscale image and printing the converted image.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-225489, filed Nov. 30, 2018, which is hereby incorporated by reference herein in its entirety.

What is claimed is:

1. An apparatus for converting a color image to a monochrome image, the apparatus comprising:
   a storage unit configured to store N monochrome values, each different from a black value and different from a white value;
   an obtainment unit configured to obtain a number (M) of color values other than black and white values in the color image; and
   a convertor configured to perform conversion from a $K^{th}$ lightest color value among the color values to a $K^{th}$ lightest monochrome value among the N monochrome values, wherein $0<K\le N$,
   wherein in a case where the obtained number (M) of the color values is less than N (M<N), the convertor performs the conversion using monochrome values from the lightest monochrome value to the $M^{th}$ lightest monochrome value without using monochrome values from a M+1 lightest monochrome value to the $N^{th}$ lightest monochrome value among the N monochrome values for the conversion.

2. The apparatus according to claim 1, wherein in a case where the number (M) of the plurality of color values included in the color image is equal to N, all of the N monochrome values are used for the conversion.

3. The apparatus according to claim 2, wherein in a case where the number (M) of the plurality of color values included in the color image is more than N, the conversion from a color value to a monochrome value is not performed by the convertor.

4. The apparatus according to claim 1, further comprising:
   a deriving unit configured to derive the number (M) of the plurality of color values included in the color image.

5. The apparatus according to claim 1,
   wherein the convertor converts the plurality of color values included in the color image to a plurality of monochrome values, and
   wherein the convertor converts the $K^{th}$ lightest monochrome value among the plurality of monochrome values to the $K^{th}$ lightest monochrome value among the N monochrome values.

6. The apparatus according to claim 1,
   wherein the color values are RGB values, and
   wherein the monochrome values are values of grayscale data.

7. A method for converting a color image to a monochrome image, the method comprising:
   storing N monochrome values, each different from a black value and different from a white value;
   obtaining a number (M) of color values other than black and white values in the color image; and
   performing conversion from a $K^{th}$ lightest color value among the color values to a $K^{th}$ lightest monochrome value among the N monochrome values, wherein $0<K\le N$,
   wherein in a case where the obtained number (M) of the color values is less than N (M<N), the performing performs the conversion using monochrome values from the lightest monochrome value to the $M^{th}$ lightest monochrome value without using monochrome values from a M+1th lightest monochrome value to the $N^{th}$ lightest monochrome value among the N monochrome values are not used for the conversion.

8. The method according to claim 7, wherein in a case where the number (M) of the plurality of color values included in the color image is equal to N, all of the N monochrome values are used for the conversion.

9. The method according to claim 8, wherein in a case where the number (M) of the plurality of color values included in the color image is more than N, the conversion from a color value to a monochrome value is not performed.

10. The method according to claim 7, further comprising:
    deriving the number (M) of the plurality of color values included in the color image.

11. The method according to claim 7,
    wherein the performing conversion converts the plurality of color values included in the color image to a plurality of monochrome values, and
    wherein the performing converts the $K^{th}$ lightest monochrome value among the plurality of monochrome values to the $K^{th}$ lightest monochrome value among the N monochrome values.

12. The method according to claim 7,
    wherein the color values are RGB values, and
    wherein the monochrome values are values of grayscale data.

13. A non-transitory computer-readable storage medium, which stores a computer program for causing a computer to execute a method for converting a color image to a monochrome image, the method comprising:
    storing N monochrome values, each different from a black value and different from a white value;
    obtaining a number (M) of color values other than black and white values in the color image; and
    performing conversion from a $K^{th}$ lightest color value among the color values to a $K^{th}$ lightest monochrome value among the N monochrome values, wherein $0<K\le N$,
    wherein in a case where the obtained number (M) of the color values is less than N (M<N), the performing performs the conversion using monochrome values from the lightest monochrome value to the $M^{th}$ lightest monochrome value without using monochrome values from a M+1th lightest monochrome value to the $N^{th}$ lightest monochrome value among the N monochrome values are not used for the conversion.

14. The non-transitory computer-readable storage medium according to claim 13, wherein in a case where the number (M) of the plurality of color values included in the color image is equal to N, all of the N monochrome values are used for the conversion.

15. The non-transitory computer-readable storage medium according to claim 14, wherein in a case where the number (M) of the plurality of color values included in the color image is more than N, the conversion from a color value to a monochrome value is not performed.

16. The non-transitory computer-readable storage medium according to claim 13, further comprising:

deriving the number (M) of the plurality of color values included in the color image.

17. The non-transitory computer-readable storage medium according to claim 13,
wherein the performing conversion converts the plurality of color values included in the color image to the plurality of monochrome values, and
wherein the performing converts a $K^{th}$ lightest monochrome value among the plurality of monochrome values to the $K^{th}$ lightest monochrome value among the N monochrome values.

18. The non-transitory computer-readable storage medium according to claim 13,
wherein the color values are RGB values, and
wherein the monochrome values are values of grayscale data.

\* \* \* \* \*